United States Patent
Gerke et al.

(10) Patent No.: US 6,625,984 B2
(45) Date of Patent: Sep. 30, 2003

(54) VARIABLE GEOMETRY NOZZLE FOR RADIAL TURBINES

(75) Inventors: Frank G. Gerke, Chillicothe, IL (US); Beth A. Hinchee, Kiel (DE); Mark D. Moeckel, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/028,389

(22) Filed: Dec. 20, 2001

(65) Prior Publication Data

US 2003/0115869 A1 Jun. 26, 2003

(51) Int. Cl.[7] ............................................... F02D 23/00
(52) U.S. Cl. ............................ 60/602; 60/603; 60/611; 415/148; 415/155
(58) Field of Search ......................... 60/600, 601, 602, 60/603, 611, 612; 123/568.11, 568.12; 415/149.1, 149.2, 151, 155, 157, 148

(56) References Cited

U.S. PATENT DOCUMENTS

| | | |
|---|---|---|
| 3,090,194 A | 5/1963 | Glamann |
| 3,423,926 A | 1/1969 | Nancarrow et al. |
| 3,443,376 A | 5/1969 | Light |
| 3,557,549 A | 1/1971 | Webster |
| 3,994,620 A * | 11/1976 | Spraker et al. ............... 60/602 |
| 4,224,794 A | 9/1980 | Woollenweber |
| 4,389,845 A * | 6/1983 | Koike .......................... 60/602 |
| 4,490,622 A | 12/1984 | Osborn |
| 4,794,758 A | 1/1989 | Nakazawa et al. |
| 4,961,319 A * | 10/1990 | Lyon ............................ 60/602 |
| 5,025,629 A | 6/1991 | Woollenweber |
| 5,119,633 A | 6/1992 | Brooks et al. |
| 5,560,208 A | 10/1996 | Halimi et al. |
| 6,058,707 A * | 5/2000 | Bischoff ........................ 60/602 |
| 6,062,025 A | 5/2000 | Okada et al. |
| 6,318,084 B1 * | 11/2001 | Schmidt et al. ............... 60/602 |

* cited by examiner

Primary Examiner—Sheldon J. Richter
(74) Attorney, Agent, or Firm—Todd T Taylor

(57) ABSTRACT

A variable geometry nozzle suitable for a radial turbine in a turbocharger for an internal combustion engine. The turbine inlet, turbine outlet or both include a vane assembly having a housing and an adjustable cartridge movable in the housing. Each cartridge has vanes having a plurality of vane sections. Each vane section provides a vane geometry different than the vane geometries of the other vane sections.

22 Claims, 3 Drawing Sheets

VARIABLE GEOMETRY NOZZLE FOR RADIAL TURBINES

TECHNICAL FIELD

The present invention relates to internal combustion engine turbochargers, and, more particularly, to a radial turbocharger having variable nozzle geometry.

BACKGROUND ART

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine may include one or more turbochargers for compressing a fluid to be supplied to one or more combustion chambers within corresponding combustion cylinders. Each turbocharger typically includes a turbine driven by exhaust gases from the engine, and a compressor driven by the turbine. The compressor receives the fluid to be compressed and supplies the compressed fluid to the combustion chambers. The fluid compressed by the compressor may be in the form of combustion air only, or may be a mixture of fuel and combustion air. Through the use of a turbocharger, the power available from an engine of given size can be increased significantly. Thus, a smaller, less expensive engine may be used for a given power requirement, and power loss due to, for example, changes in altitude, can be compensated for.

Sizing a turbocharger for proper performance under all engine operating conditions can be difficult. In an exhaust gas turbocharger, exhaust gas flow and turbine design determine turbine performance, and thereby compressor performance and turbocharger efficiency. Vanes in the inlet throat or outlet nozzle of the turbine can be used to influence flow characteristics through the turbine, and thereby the turbine power generated for a given exhaust gas flow. If the engine is to be operated at or near full load during most of its operating cycle, it is not difficult to design the turbocharger for efficient performance. However, if the engine is to be operated at significantly less than full load for extended periods of time, it becomes more difficult to design a turbocharger that will perform well throughout the operating range of the engine. Desirably, the turbocharger will provide the required level of pressure boost, respond quickly to load changes, and function efficiently under both high load and low load conditions.

For an engine having a wide range of operating load, it has been know to size the turbine for proper performance under full load conditions. A problem with this approach is that the turbocharger responds slowly at low speed, and the boost pressure available at low engine speeds is minimal. As an alternative, it has been known to provide a turbine design that exceeds the power requirements at full load, and to use a waste gate to bypass excess exhaust gas flow after the turbocharger has reached the desired boost level. An "oversized" turbine of this type will provide greater boost at lower load conditions, and will respond more quickly at lower speeds, but engine back pressure is increased and the energy in the bypassed exhaust flow is wasted.

It is known to control turbocharger performance by controlling exhaust gas flow through the turbine of the turbocharger. Controllable vanes in the turbine throat and/or nozzle exit have been used to control turbine efficiency, and thereby turbocharger performance. Pivotable vanes connected by linkage to a control ring have been used. Rotation of the ring changes the vane angle, and thereby the flow characteristics of the exhaust gas through the turbine. U.S. Pat. No. 4,490,622 discloses a turbocharger in which nozzle vanes are spaced circumferentially about the turbine rotor, and a control linkage controls the position of the nozzle vanes, to vary the flow of exhaust gases to the turbine.

Many of the known variable nozzle designs are complex, having numerous pivotal connections and complex linkages. Such complex designs may be prone to failure and wear.

The present invention is directed to overcoming one or more of the problems as set forth above.

DISCLOSURE OF THE INVENTION

In one aspect of the invention, an internal combustion engine is provided with a plurality of combustion cylinders; an exhaust manifold coupled with the combustion cylinders; and an intake manifold coupled with the combustion cylinders. A turbocharger includes a turbine defining an exhaust gas flow path having a turbine inlet coupled with the exhaust manifold and a turbine outlet, and a compressor having a compressor inlet and a compressor outlet. The compressor outlet is coupled with the intake manifold. An adjustable vane assembly is provided for at least one of the turbine inlet and the turbine outlet. The adjustable vane assembly includes a housing, and a controllable vane cartridge disposed in the housing. The cartridge has vanes therein, the vanes having a plurality of vane sections each configured in a different vane geometry. An adjustment device is associated with the cartridge, the cartridge having different positions in the housing placing different vane sections in the exhaust gas flow path.

In another aspect of the invention, turbocharger is provided with a turbine defining an exhaust gas flow path therethrough, a turbine inlet to the flow path and a turbine outlet from the flow path. A compressor is driven by the turbine and includes a compressor inlet and a compressor outlet. An adjustable vane assembly for at least one of the turbine inlet and the turbine outlet includes a housing, and a controllable vane cartridge disposed in the housing. The cartridge has vanes therein, the vanes having a plurality of vane sections each configured in a different vane geometry. An adjustment device associated with the cartridge has different positions in the housing placing different vane sections in the exhaust gas flow path.

In yet another aspect of the invention, a method of operating an internal combustion engine, is provided with steps of providing a plurality of combustion cylinders, an first exhaust manifold and an intake manifold; transporting exhaust gas from the combustion cylinders to the exhaust manifold; providing a turbocharger including a turbine having an exhaust gas flow path there through, a turbine inlet and a turbine outlet, and a compressor having a compressor inlet and a compressor outlet; providing an adjustable vane assembly for at least one of the turbine inlet and the turbine outlet, and providing in the vane assembly a housing, and vanes having a plurality of vane sections each of a different vane geometry, and an adjustment device for moving the vane sections into and out of the flow path; rotatably driving the turbine with exhaust gas introduced at the turbine inlet; introducing combustion gas at the compressor inlet; transporting combustion gas from the compressor outlet to the intake manifold; sensing at least one of operating conditions of the engine and performance of the turbocharger; controlling the adjustment device in response to at least one of the engine operating conditions and the performance of the turbocharger; moving the vanes in the housing; and positioning a selected vane section in the exhaust gas flow path.

BEST MODE FOR CARRYING OUT THE INVENTION

Figure 1:
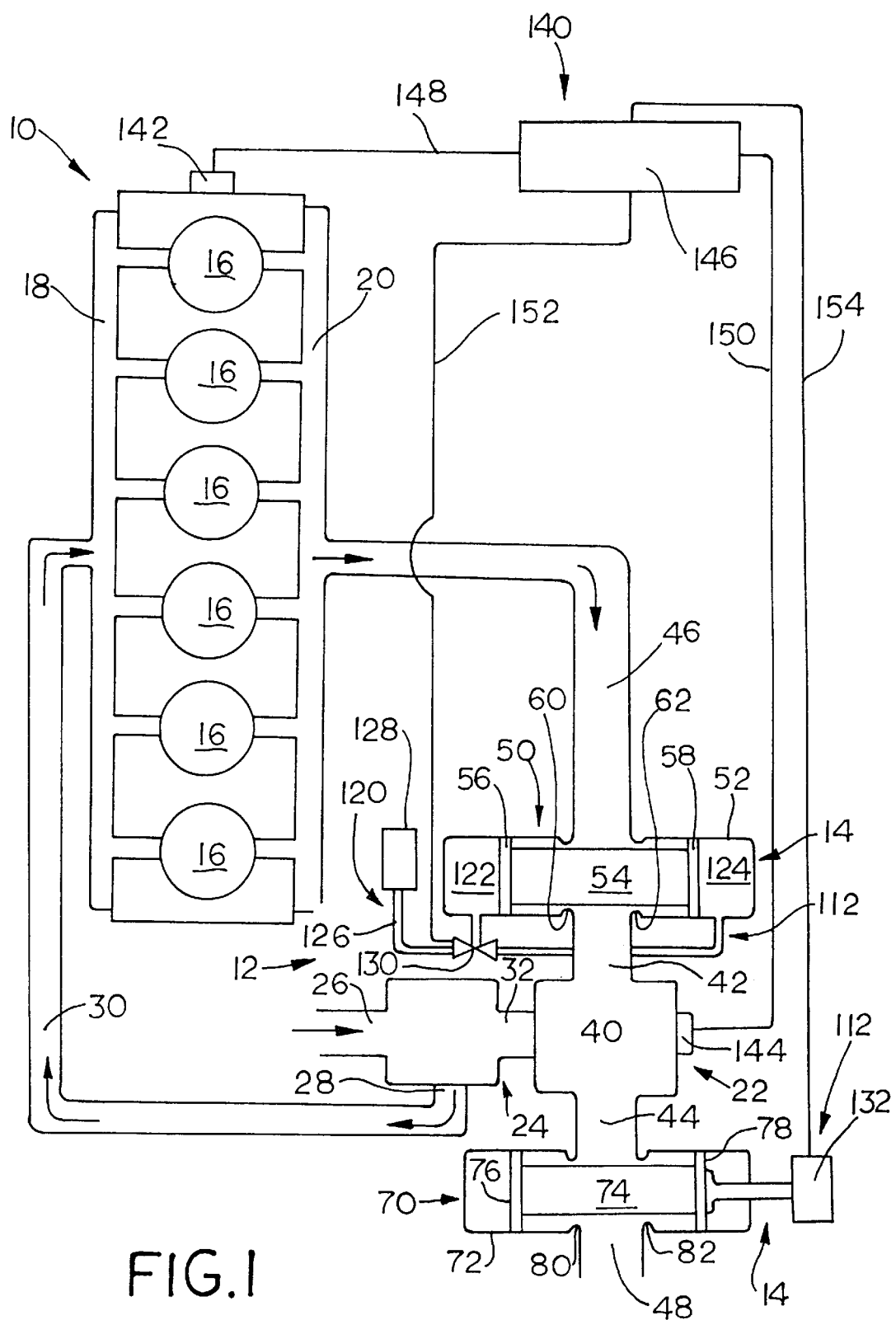
FIG. 1 is a schematic illustration of an internal combustion engine having a turbocharger including a variable geometry nozzle in accordance with the present invention.

Referring now to the drawings, and particularly to FIG. 1, an internal combustion engine 10 is shown, including a turbocharger 12 in which the present invention for a variable geometry nozzle 14 may be used. Two variable geometry nozzles 14 are shown for turbine 12, as will be described more fully hereinafter.

Internal combustion engine 10 includes a plurality of combustion cylinders 16, and as shown in FIG. 1, includes six combustion cylinders 16. Each combustion cylinder 16 is coupled with an intake manifold 18 and with an exhaust manifold 20. While a single intake manifold 18 is shown, it should be understood that more than one intake manifold may be used, with each intake manifold 18 coupled to a plurality of combustion cylinders 16, for providing an air mixture to each combustion cylinder 16. Further, while a single exhaust manifold 20 is shown, it should be understood that more than one exhaust manifold may be provided, with each exhaust manifold coupled to a different plurality of combustion cylinders 16. A fuel, such as diesel fuel, or fuel air mixture is introduced into each combustion cylinder and combusted therein, in a known manner.

Turbocharger 12 includes a turbine 22, and a compressor 24. Compressor 24 includes a compressor inlet 26 and a compressor outlet 28. Compressor inlet 26 receives combustion gas from a source such as ambient air, and compressor outlet 28 supplies compressed combustion gas to intake manifold 18 of engine 10 through a conduit 30. Compressor 24 includes a compressor wheel (not shown) mounted on a turbocharger shaft 32 in known manner. While a single compressor 24 is shown, it should be understood that more than one compressor may be provided, each with a compressor wheel mounted on shaft 32, and having an interstage duct connecting the compressors in series.

Turbine 22 includes a turbine casing 40 defining a turbine inlet 42 and a turbine outlet 44. A turbine wheel, (not shown) is mounted on shaft 32 in turbine casing 40. Turbine inlet 42 is connected in flow communication with exhaust manifold 20 via a fluid conduit 46. Turbine outlet 44 is connected to fluid conduit 48, leading to a further exhaust system (not shown) of engine 10, which may include one or more mufflers, with subsequent discharge to an ambient environment. Generally, turbine 22 defines an exhaust gas flow path therethrough, from fluid conduit 46 to fluid conduit 48.

An adjustable vane assembly 50 is provided at turbine inlet 42, to controllably influence the flow characteristics of an exhaust gas stream entering turbine 22. Adjustable vane assembly 50 includes a housing 52 and an adjustable vane cartridge 54 disposed in housing 52. Housing 52 and adjustable vane cartridge 54 disposed therein are in flow communication with conduit 46 and turbine inlet 42. Seals 56 and 58 are provided at opposite ends of vane cartridge 54. Seals 60 and 62 are provided between housing 52 and vane cartridge 54.

An adjustable vane assembly 70 is provided at turbine outlet 44 to controllably influence the flow characteristics of the exhaust gas stream exiting turbine 22. Adjustable vane assembly 70 includes a housing 72 and an adjustable vane cartridge 74 disposed in housing 72. Housing 72 and adjustable vane cartridge 74 disposed therein are in flow communication with turbine outlet 44 and conduit 48. Seals 76 and 78 are provided at opposite ends of vane cartridge 74. Seals 80 and 82 are provided between housing 72 and vane cartridge 74.

Figure 2:
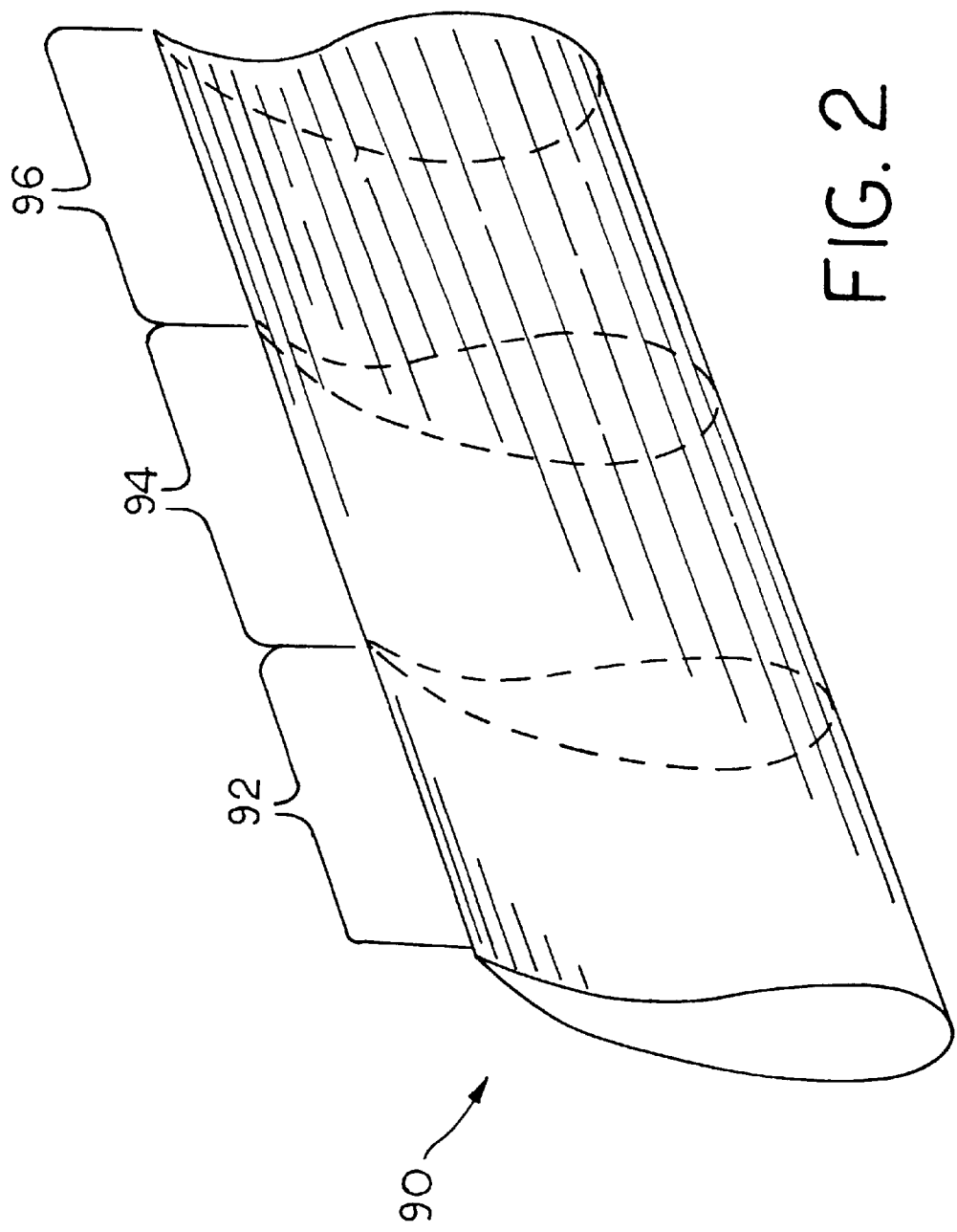
FIG. 2 is a perspective view of one embodiment of a vane in accordance with the present invention.

In any particular application of the present invention, either adjustable vane assembly 50 or adjustable vane assembly 70, or both may be used. Each adjustable vane cartridge 54 and adjustable vane cartridge 74 includes a plurality of vanes suitable for performance at the inlet or outlet, respectively, of turbine 22. FIG. 2 illustrates one suitable vane 90 which may be used, for example, in cartridge 74 at turbine outlet 44. Cartridge 74 includes a plurality of vanes 90, each having discrete vane sections. In the embodiment shown, three such vane sections are provided, a first end section 92, a transition section 94 and a second end section 96 are provided. Section 92 at one end of vane 90 has a certain given geometry appropriate for one design operating extreme of turbine 22. Section 96 at the opposite end of vane 90 has a certain given geometry appropriate for the other design operating extreme of turbine 22. Transition section 94 between end sections 92 and 96 has a continuously varying geometry transitioning from the geometry of section 92 to the geometry of section 96.

As used herein, the terms vane "geometry", vane section "geometry" and similar and related terms shall mean the general shape and surface contour of the vane or vane section to which it pertains. As those skilled in the art understand, vane geometry influences the flow of exhaust gases through a turbine having inlet throat nozzle vanes or exit nozzle vanes. Open are and flow angles can be used for turbine control.

Housing 52 is of sufficient length to allow each of the vane sections to be positioned in the flow path between conduit 46 and turbine inlet 42. FIG. 1 illustrates transition section 94 positioned in the flow path.

Figure 3:
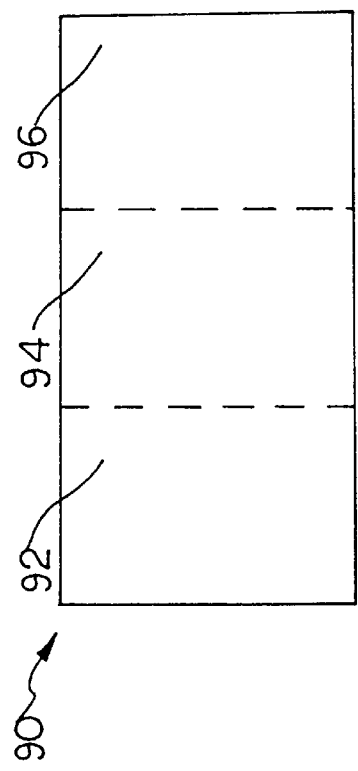
FIG. 3 is a schematic illustration for explaining one type of vane structure according to the present invention.

FIG. 3 is a simplified diagram for illustration of the aforedescribed vane 90. While not intended to depict the actual shape of vane 90, FIG. 3 illustrates in a simplified manner the regions defining sections 92, 94 and 96.

Figure 4:
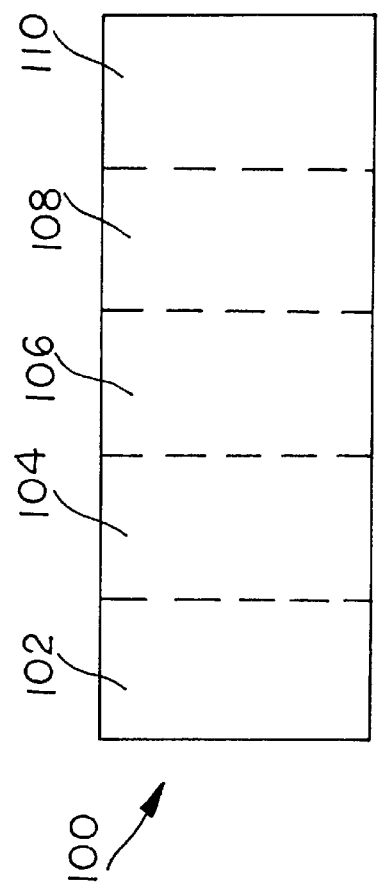
FIG. 4 is a schematic illustration for explaining another type of vane structure according to the present invention.

FIG. 4 is a simplified illustration, similar to FIG. 3, but illustrating a different embodiment for a vane 100. Vane 100 includes end sections 102 and 110 having given geometries appropriate for the operating extremes of turbine 22, similar to end sections 92 and 96 of vane 90. However, instead of a continuously varying intermediate section, such as transition section 94 geometrically transitioning from one extreme to the other, vane 100 includes a plurality of intermediate sections 104, 106 and 108, each having a fixed, but different geometry. Intermediate sections 104, 106 and 108 thereby establish a plurality of steps that advance from the one extreme geometry to the other extreme geometry provided in end sections 102 and 110.

Housing 72 is of sufficient length to allow each of the vane sections 102, 104, 106, 108 and 110 to be positioned in the flow path between conduit 48 and turbine outlet 44. FIG.

1 illustrates center most intermediate section 106 positioned in the flow path.

While FIG. 4 illustrates a vane having three intermediate steps in geometry, it should be understood that a particular application of the invention also may include fixed intermediate sections having one, two, four or more steps, and the invention is not limited to three intermediate steps. Further, a vane cartridge may include a mixture of one or several fixed steps in geometry and a continuously transition section between fixed geometry sections.

FIG. 1 illustrates two acceptable adjustment devices 112 for moving cartridges 54 and 74 in housings 52 and 72, respectively. A pneumatic system 120 is illustrated for adjusting cartridge 54. Housing 52 includes sealed chambers 122 and 124, connected by a fluid line 126 to a pressurized fluid source 128. A valve system illustrated for simplicity by a single valve 130 is provided to control the flow of fluid into and out of chambers 122 and 124, as those skilled in the art will understand readily.

In the structure shown for adjusting cartridge 74, a mechanical actuator 132 is provided, to control movement of cartridge 74 in housing 72. Mechanical actuator 132 may be a hydraulic cylinder, a motor activated assembly, or the like.

The adjustment systems shown are examples of suitable systems, and other means for adjusting cartridges 54 and 74 may also be used. Further, it is contemplated that various adjustment systems may be used with either vane assembly 50 or vane assembly 70, and pneumatic system 120, for example, is not limited to use with a continuously varying vane assembly 50.

A control system 140 is provided for operating adjustable vane assemblies 50 and 70. Control system 140 senses operating conditions of engine 10 and/or turbocharger 12. One or more engine sensors 142 and/or one or more turbocharger sensors 144 are connected to a controller 146 via signal lines 148 and 150. While only a single engine sensor 142 and a single turbocharger sensor 144 are schematically illustrated in FIG. 1 for simplicity, those skilled in the art will recognize and understand that numerous sensor types may be required. Several different sensor types, at a variety of locations in engine 10 and turbocharger 12 may be required to provide appropriate signal inputs to controller 146. Such sensors are known to those skilled in the art, and will not be described in greater detail herein. Sensors 142 and 144 can be selected and positioned to generate a signal to controller 146 indicative of one or more conditions such as engine speed or load, intake manifold pressure, turbocharger speed, boost and barometric pressure. Adjustable vane assemblies 50 and 70 receive operating command signals for adjustment of cartridges 54 and 74 from controller 146 via signal lines 152 and 154.

INDUSTRIAL APPLICABILITY

During use of engine 10, a fuel, such as diesel fuel, is injected into combustion cylinders 16 and combusted when a piston (not shown) disposed within each combustion cylinder 16 is at or near a top dead center position. Exhaust gas is transported from each combustion cylinder 16 to exhaust manifold 20. At least a portion of the exhaust gas within exhaust manifold 20 is transported to conduit 46 and turbine inlet 42, to flow through turbine 22, for rotatably driving the turbine wheel (not shown). The spent exhaust gas is discharged from turbine 22 through turbine outlet 44. An exhaust gas re-circulation (EGR) system (not shown) may be provided to re-circulate a portion of exhaust gas from exhaust manifold 20 to intake manifold 18, for the known advantages of EGR systems.

Turbine 22 transmits power to compressor 24 through shaft 32. Compressor 24 draws combustion air into compressor inlet 26. The combustion air is compressed within compressor 24, and is discharged from compressor 24 through compressor outlet 28 and conduit 30 to intake manifold 18. Those skilled in the art will understand that turbocharger 12 may include more than one compressor, with an interstage duct directing the combustion air from the first compressor to the second compressor, for further compression.

Engine sensors 142 and turbocharger sensors 144 determine one or more operating conditions of engine 10 or turbocharger 12, and send signals relating to the condition via signal lines 148 and 150 to controller 146. Controller 146 actuates adjustment of adjustable vane assemblies 50 and 70, to alter the performance of turbocharger 12, by transmitting operating signals along signal lines 152 and 154. Either or both of vane assemblies 50 and 70 can be adjusted to achieve the desired change in the performance of turbocharger 12.

If a pneumatic system 120 is used, valving system 130 is actuated to supply pressurized fluid from fluid source 128 to either sealed chamber 122 or sealed chamber 124, and to return fluid from the other sealed chamber 122 or 124, thereby moving the position of a adjustable vane assembly 50 or 70 associated therewith. If a mechanical actuator 132 is used, the actuator is similarly activated to move adjustable vane assembly 50 or 70 one direction or the other, to alter the vane section disposed in the exhaust gas flow path defined within and through turbine 22.

If a adjustable vane assembly 50 is used, having an adjustable vane cartridge 54 therein, opposite operating extremes of turbocharger 12 are achieved by positioning either fixed end section 92 or fixed end section 96 in the exhaust gas flow path defined by turbine 22. If turbocharger performance other than one of the two extremes is required, cartridge 54 is moved within housing 52 until a suitably configured vane area in transition section 94 is positioned in the exhaust gas flow path, to achieve the desired turbine performance. As engine sensor 142 or turbocharger sensor 144 determines changes in performance requiring compensation, adjustable vane assembly 50 can be moved a small amount, to maintain the desired performance.

If an adjustable vane assembly 70 is used, having a plurality of fixed geometry intermediate vane sections 104, 106 and 108, cartridge 74 is moved within housing 72 to provide the appropriate flow control for the desired performance. When a significant change is to occur, it may be desirable to step the turbine through the change, delaying for a brief interval at one or several intermediate steps between the former position and the desired new position.

The variable geometry nozzles according to the present invention provide adjustability for turbine performance control in an efficient, simple construction, having few moving parts, with substantially minimized tendency toward failure.

Other aspects, objects and advantages of this invention can be obtained from a study of the drawings, the disclosure and the appended claims.

What is claimed is:

1. An internal combustion engine, comprising:
   a plurality of combustion cylinders;
   an exhaust manifold coupled with said combustion cylinders;
   an intake manifold coupled with said combustion cylinders;

a turbocharger including a turbine defining an exhaust gas flow path having a turbine inlet coupled with said exhaust manifold and a turbine outlet, and a compressor having a compressor inlet and a compressor outlet, said compressor outlet coupled with said intake manifold; and an adjustable vane assembly for at least one of said turbine inlet and said turbine outlet, said adjustable vane assembly including a housing, a controllable vane cartridge disposed in said housing, said cartridge having vanes therein, said vanes each having a plurality of vane sections each configured in a different vane geometry, said cartridge adapted for movement in said housing for selectively positioning said vane sections into and out of said exhaust gas flow path, and an adjustment device associated with said cartridge for moving said cartridge in said housing.

2. The internal combustion engine of claim 1, said vanes having a plurality of sections each of fixed and different vane geometries.

3. The internal combustion engine of claim 1, said adjustable vane assembly disposed in said turbine inlet.

4. The internal combustion engine of claim 3, including an adjustable vane assembly disposed in said turbine outlet.

5. The internal combustion engine of claim 1, said adjustable vane assembly disposed in said turbine outlet.

6. The internal combustion engine of claim 1, said adjustment device including a pneumatic system.

7. The internal combustion engine of claim 1, said adjustment device including a mechanical actuator.

8. The internal combustion engine of claim 1, said adjustment device including a sensor adapted to ascertain an operating condition of said internal combustion engine, and a controller connected to said sensor for responding to said operating condition to operate said adjustment device.

9. The internal combustion engine of claim 1, said vanes including a transition section having a continuously varying geometry transitioning from a first vane geometry to a second vane geometry.

10. A turbocharger comprising:
a turbine defining an exhaust gas flow path therethrough, a turbine inlet to said flow path and a turbine outlet from said flow path;
a compressor driven by said turbine and including a compressor inlet and a compressor outlet; and
an adjustable vane assembly for at least one of said turbine inlet and said turbine outlet, said adjustable vane assembly including a housing, a controllable vane cartridge disposed in said housing, said cartridge having vanes therein, said vanes each having a plurality of vane sections each configured in a different vane geometry, said cartridge adapted for movement in said housing for selectively positioning said vane sections into and out of said exhaust gas flow path, and an adjustment device associated with said cartridge for moving said cartridge in said housing.

11. The turbocharger of claim 10, said vanes having at least three vane sections, each said vane section having a vane geometry different from the vane geometry of the other said vane sections.

12. The turbocharger of claim 10, said adjustable vane assembly disposed in said turbine inlet.

13. The turbocharger of claim 12, including an adjustable vane assembly disposed in said turbine outlet.

14. The turbocharger of claim 10, said adjustable vane assembly disposed in said turbine outlet.

15. The turbocharger of claim 10, said adjustment device including a pneumatic system.

16. The turbocharger of claim 10, said adjustment device including a mechanical actuator.

17. The turbocharger of claim 10, said adjustment device including an engine sensor adapted to ascertain an operating condition of an internal combustion engine, and a controller connected to said sensor and responding to said operating condition to operate said adjustment device.

18. The turbocharger of claim 10, said plurality of vane sections including a vane section having a continuously varying vane geometry transitioning from a first vane geometry to a second vane geometry.

19. A method of operating an internal combustion engine, comprising the steps of:
providing a plurality of combustion cylinders, an first exhaust manifold and an intake manifold;
transporting exhaust gas from said combustion cylinders to said exhaust manifold;
providing a turbocharger including a turbine having an exhaust gas flow path there through, a turbine inlet and a turbine outlet, and a compressor having a compressor inlet and a compressor outlet;
providing an adjustable vane assembly for at least one of said turbine inlet and said turbine outlet, and providing in said vane assembly a housing, and vanes each having a plurality of vane sections each of a different vane geometry, and an adjustment device for move said vane sections into and out of said flow path;
rotatably driving said turbine with exhaust gas introduced at said turbine inlet;
introducing combustion gas at said compressor inlet;
transporting combustion gas from said compressor outlet to said intake manifold;
sensing at least one of operating conditions of said engine and performance of said turbocharger;
controlling said adjustment device in response to at least one of said engine operating conditions and said performance of said turbocharger;
moving said vanes in said housing; and
positioning a selected vane section in said exhaust gas flow path while moving other vane sections out of said exhaust gas flow path.

20. The method of claim 19, including providing said adjustable vane assembly at said turbine inlet, and controlling flow characteristics of exhaust gas flow entering said turbine.

21. The method of claim 20, including providing a second adjustable vane assembly at said turbine outlet, and controlling flow characteristics of exhaust gas flow exiting said turbine.

22. The method of claim 19, including providing said adjustable vane assembly at said turbine outlet, and controlling flow characteristics of exhaust gas flow exiting said turbine.

* * * * *